United States Patent
Fennell

[15] 3,704,481
[45] Dec. 5, 1972

[54] AUTOMOTIVE HEADLAMP CLEANING SYSTEM

[72] Inventor: Lewis Harvey Fennell, 141 Seminary Avenue, Greensburg, Pa. 15601

[22] Filed: May 21, 1971

[21] Appl. No.: 145,717

Related U.S. Application Data

[60] Continuation-in-part of Ser. No. 834,989, June 20, 1969, abandoned, which is a division of Ser. No. 562,012, April 20, 1966, Pat. No. 3,493,804, which is a continuation-in-part of Ser. No. 414,711, Nov. 30, 1964, abandoned.

[52] U.S. Cl. ............15/250.01, 15/250.1, 15/250.22
[51] Int. Cl. ................................................B60s 1/04
[58] Field of Search............15/250.1, 250.22, 250.01

[56] References Cited

UNITED STATES PATENTS

| | | | |
|---|---|---|---|
| 1,146,497 | 7/1915 | Houdaille | 15/250.1 |
| 1,472,287 | 10/1923 | Bauer | 15/250.1 |
| 1,526,283 | 2/1925 | Hill | 15/250.1 |
| 1,942,184 | 1/1934 | Pisacano | 15/250.1 |
| 3,058,142 | 10/1962 | Pollock | 15/250.22 |
| 2,178,068 | 10/1939 | Cordova | 15/250.4 |
| 3,599,269 | 8/1971 | Congdon | 15/250.4 |

FOREIGN PATENTS OR APPLICATIONS

| | | | |
|---|---|---|---|
| 714,779 | 9/1954 | Great Britain | 15/250.22 |
| 676,967 | 12/1963 | Canada | 15/250.22 |
| 1,041,171 | 5/1953 | France | 15/250.22 |

*Primary Examiner*—Peter Feldman
*Attorney*—Donn J. Smith

[57] ABSTRACT

I disclose a headlamp cleaning system comprising wiper means having flexible wiper edge means in contact with headlamp means, means for rotatably supporting one of said wiper and said headlamp means, and means for driving that one of said wiper and said headlamp means so supported such that said wiper and said headlamp means are relatively rotated one against the other, said wiper being elongated and supported at its ends by annular support means which are substantially aligned with said headlamp means so that said wiper is longitudinally engaged therewith during said relative rotation of the wiper and headlamp means.

33 Claims, 21 Drawing Figures

PATENTED DEC 5 1972

INVENTOR
L. Harvey Fennell
By Buell Blenko & Ziesenheim
His Attorneys

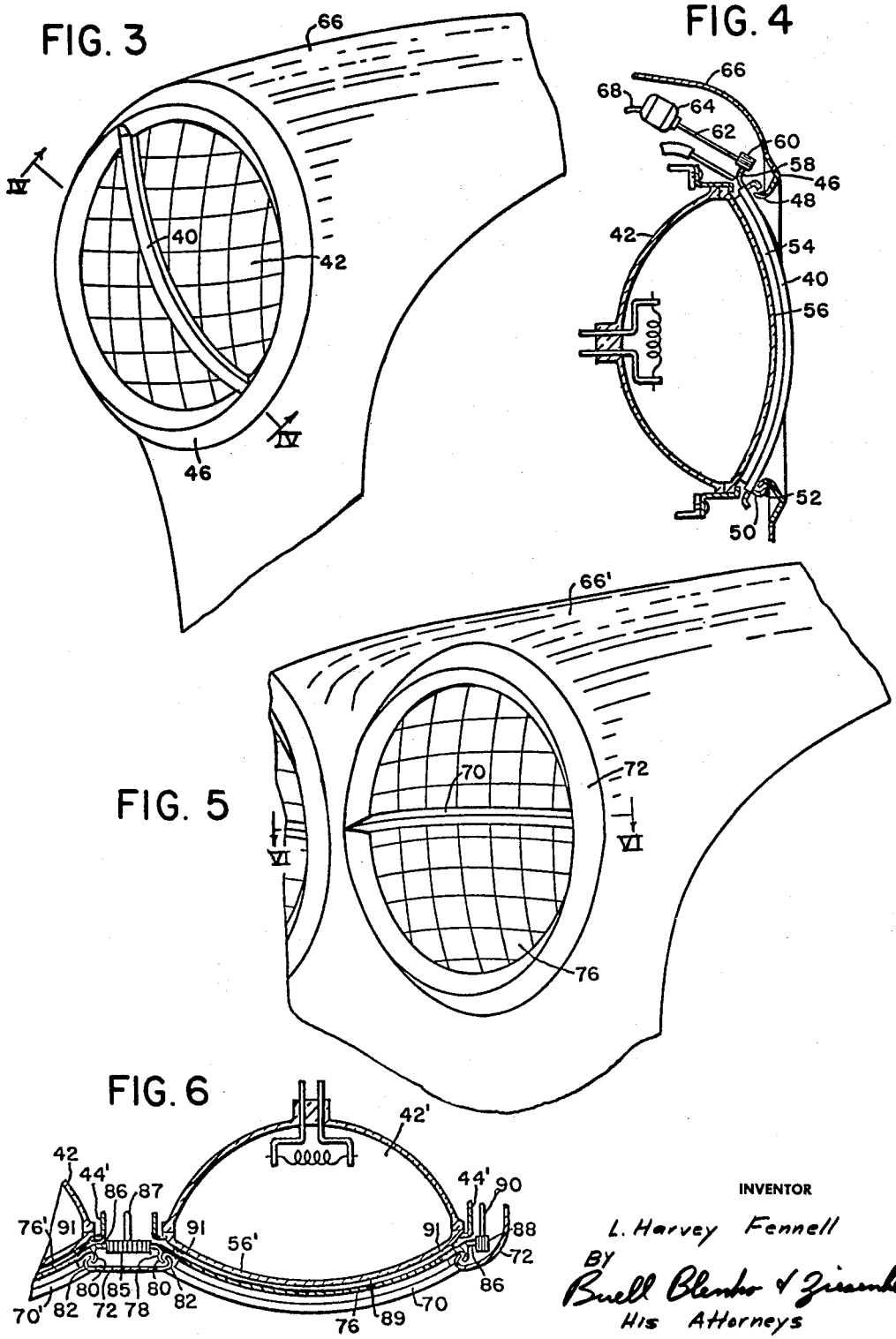

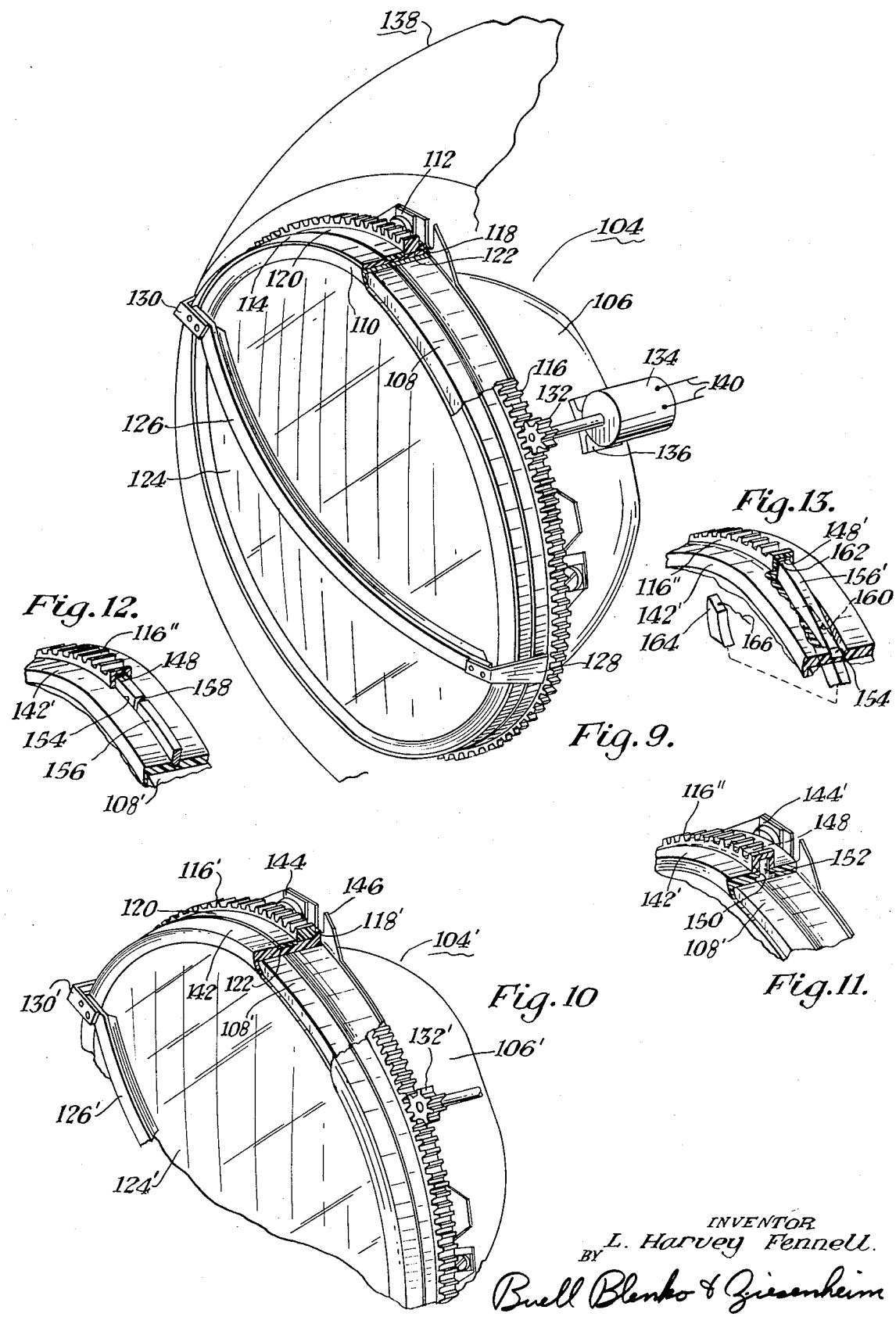

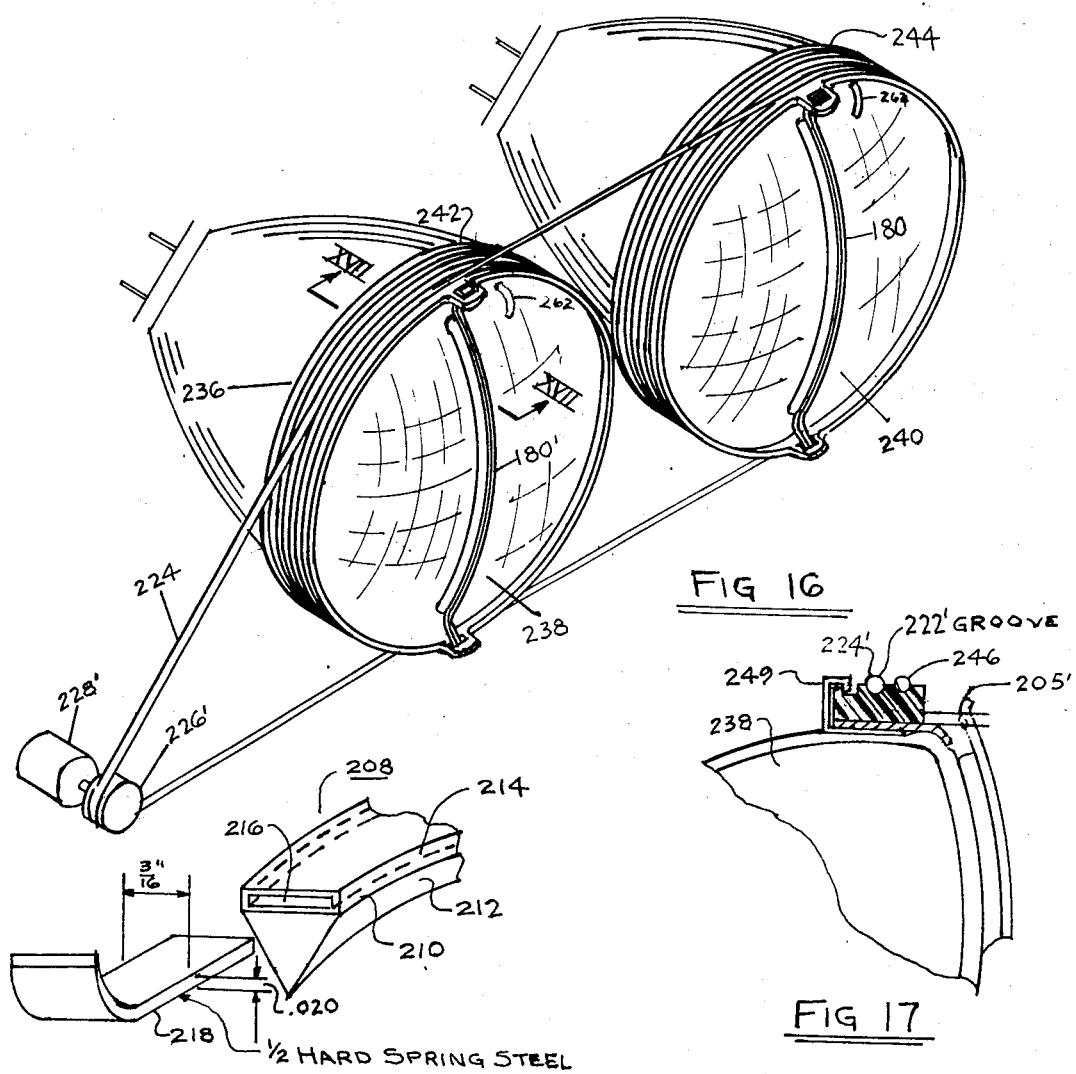
FIG 16
FIG 17
FIG 15C
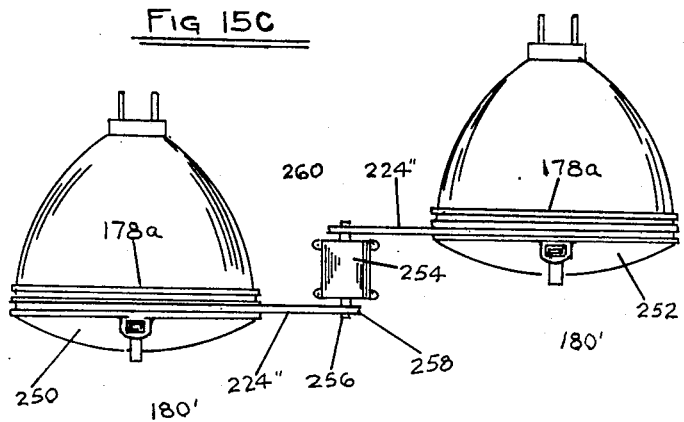
FIG 18

AUTOMOTIVE HEADLAMP CLEANING SYSTEM

The present application is a continuation-in-part of my copending application entitled Automotive Headlamp Cleaning System filed June 20, 1969, Ser. No. 834,989, now abandoned, which was a division of my then copending application entitled Automotive Headlamp With Integral Cleaning System, filed Apr. 20, 1966, Ser. No. 562,012, now U.S. Pat. No. 3,493,804, which was a continuation-in-part of my then copending application entitled Automotive Headlamp Cleaner, filed Nov. 30, 1964, Ser. No. 414,711 (now abandoned).

This invention relates to headlamp cleaners. More specifically, it relates to automotive headlamp cleaners employing a rotary wiper which cleans the surface of the lens of the headlamp.

It is well known that the effectiveness of automobile headlamps is sharply reduced, especially in winter, by the accummulation of road dirt on the lenses. This accummulation is caused when dirt ladened water splashed on the headlamps is evaporated by the heat of the headlamps leaving a hardened film of suspended dirt coated upon the lenses. At night and in bad weather, it is inconvenient and dangerous to get out of the car and wipe the headlamps. It is also dangerous to continue driving with the effectiveness of the headlamps impaired.

The instant invention solves the problem by providing a means for mechanically cleaning the headlamps which can be activated from within the car. Of equal importance, a minimum of the headlamp cleaning system projects outwardly of the automobile to minimize potential damage and vandalism. Those components which do project forwardly of the headlamp are arranged to offer minimum interference to the light output.

I am aware of a number of previous attempts to solve the headlamp cleaning problem. For example Canadian Pat. No. 662,077 and the U.S. Pats. to Baughn No. 2,288,429; Bryant No. 2,884,656; Bryant No. 3,072,947; and Bird et al. No. 2,749,568 disclose various cleaning implements mounted on propeller-like structures which are rotated by wind pressure. Although satisfactory for some purposes these devices require the vehicle to be in rapid motion. The Canadian Pat. to Frost No. 676,967 utilizes a number of external operating components which are subject to damage and which apparently do not adequately cover the entire headlamp lens area. The latter disadvantage is entailed also in the cleaning systems of U.S. Pats. to Pollock Nos. 3,058,142; Purden 2,334,508; and Kuester 3,546,732. Still other headlamp and windshield cleaners are capable of operating only on flat or substantially flat surfaces, for example the British Pats. to Trevaskis No. 714,779; Cordova No. 532,513 and Smith No. 410,216; Australian Pat. to Birchall No. 229,252; Canadian Pat. to Monnenbruch No. 201,432; and U.S. Pat. Nos. to Rappl et al. 2,284,966; Abodeely 3,138,816; Cranston 1,269,395; and Eichler 3,050,765.

In general prior headlamp cleaning systems do not provide adequate means for applying a cleaning solution or solvent to the headlamp lens when the cleaner or wiper blade is actuated. Many of the prior headlamp cleaning systems and similar devices include a large number of complicated parts, which conflict with the space limitations imposed by modern vehicles, particularly passenger automobiles.

I realize the advantages alluded to above and overcome the deficiencies of the prior art by providing a headlamp cleaning system comprising a wiper having flexible wiper edge means in contact with headlamp means, means for rotatably supporting one of said wiper and said headlamp means, and means for driving that one of said wiper and said headlamp means so supported so that said wiper and said headlamp means are relatively rotated one against the other, said wiper having a support fastened at a point outside the surface of the headlamp and extended into the area in front of the headlamp, a mounting on the support, a shaft journaled in the mounting and disposed generally perpendicular to the lens of the headlamp and extended toward the center thereof, a liquid reservoir and conduit system with at least one opening therein adjacent the lens of the headlamp, and said wiper being fastened at its center to the end of the shaft adjacent the lens and having longitudinal contact with said lens.

I also desirably provide a headlamp cleaning system comprising a wiper having flexible wiper edge means in contact with headlamp means, means for rotatably supporting one of said wiper and said headlamp means, and means for driving that one of said wiper and said headlamp means so supported so that said wiper and said headlamp means are relatively rotated one against the other, said wiper being elongated and supported at its ends by an annular support which is substantially aligned with said headlamp means, said support being mounted adjacent said headlamp means so that said wiper is longitudinally engaged therewith during said relative rotation of the wiper and headlamp means.

I also desirably provide a similar headlamp cleaning system wherein said support is a generally circular bracket rotatably mounted on a headlamp rim for said headlamp means and substantially aligned with the periphery of said headlamp means.

I also desirably provide a similar headlamp cleaning system wherein said annular support is a headlamp rim for said headlamp mounted generally in alignment with said headlamp means but spaced forwardly thereof, said headlamp means include a light-transmitting lens shield positioned generally between said wiper and said lens, and means are provided for rotatably mounting one of said shield and said wiper, said driving means being coupled to that one of said wiper and said shield so mounted.

I also desirably provide a similar headlamp cleaning system wherein said wiper is fabricated from transparent material.

I also desirably provide a similar headlamp cleaning system wherein said annular support is slidably engaged with said headlamp means, and means are provided for tracking said annular support on said headlamp means.

I also desirably provide a similar headlamp cleaning system wherein said tracking means include means engaging said annular support for restraining said support against forward motion thereof relative to said headlamp means, said support being restrained against rearward motion thereof by engagement of said wiper means with said headlamp means.

I also desirably provide a similar headlamp cleaning system wherein said tracking means include guide means secured to said headlamp means and extending into a circumferential groove formed in said annular support.

I also desirably provide a similar headlamp cleaning system wherein said driving means include a transmission belt, and said annular support is provided with a second groove generally parallel to the first-mentioned groove for receiving said transmission belt.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein:

FIG. 3 is an isometric view of still another form of my headlamp cleaner incorporating a modified arrangement for concealing the supporting and rotating mechanism for the cleaner;

FIG. 4 is a vertically sectioned view of the apparatus as shown in FIG. 3 and taken along the reference line IV — IV thereof;

FIG. 5 is an isometric view of still another form of my headlamp cleaner mechanism employing a stationary wiper blade;

FIG. 6 is a horizontally sectioned view of the apparatus as shown in FIG. 5 and taken along reference line VI — VI thereof;

FIG. 9 is an isometric view, partially broken away of still another form of my headlamp cleaning arrangement;

FIG. 10 is a similar view of the modification of the arrangement as shown in FIG. 9;

FIG. 11 is a similar view of still another modification of the apparatus shown in the preceding figures;

FIG. 12 is a similar view of a modified form of the gear ring tracking means of FIG. 11;

FIG. 13 is a similar view of another form of the gear ring tracking means;

FIG. 15C is an exploded view of one form of wiper assembly made in accordance with the invention;

FIG. 16 is an isometric view similar to FIG. 14 but showing the automotive headlamp cleaning system as modified for use with dual headlights;

FIG. 17 is a partial cross-sectional view of the apparatus as shown in FIG. 16 and taken along reference line XVII — XVII thereof; and FIG. 18 is an isometric view of another arrangement of my headlamp cleaning system, as modified for dual headlamps.

Figure 1:
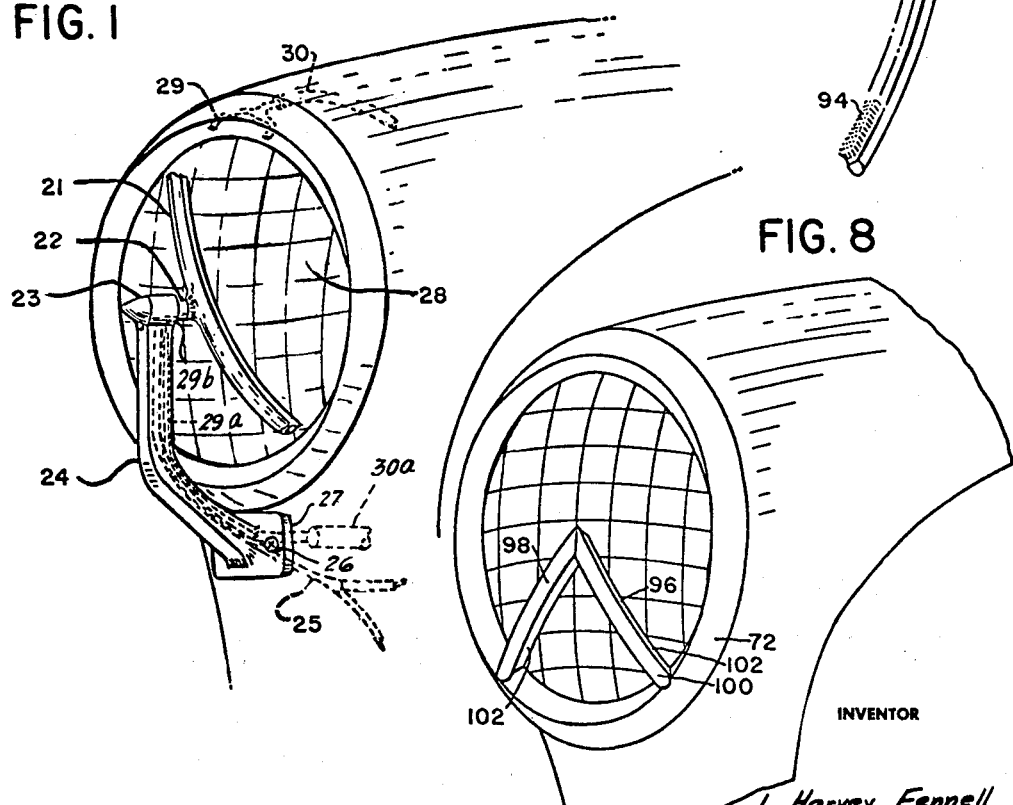
FIG. 1 is an isometric view of one form of my headlamp cleaner mechanism with the driving means therefor incorporated in the supporting bracket for the mechanism.

FIG. 1 shows the application of the invention to a conventional headlamp in which a plexiglass arm or support having a base which is fastened to the body of the car by screws 26. A motor 23 is positioned at the upper end of support 24. Wires 25 lead from motor 23 downwardly through the hollow center of support 24 to a point inside the car where they are joined to the car's electrical system. Shaft 22 turned by motor 23 has a wiper 21 of a suitable material, connected to it and having longitudinal contact with the headlamp lens 28. Openings 28 connected through tube 30 to a conventional window washing liquid reservoir introduce water onto the lens. Alternatively and preferably washing fluid is introduced through passage 29a extending through support 24 from tube 30a. In the latter case the cleaning fluid is desirably ejected forceably onto the lens 28 from opening 29b for more efficient washing action in conjunction with operation of the wiper 21.

Figure 2:
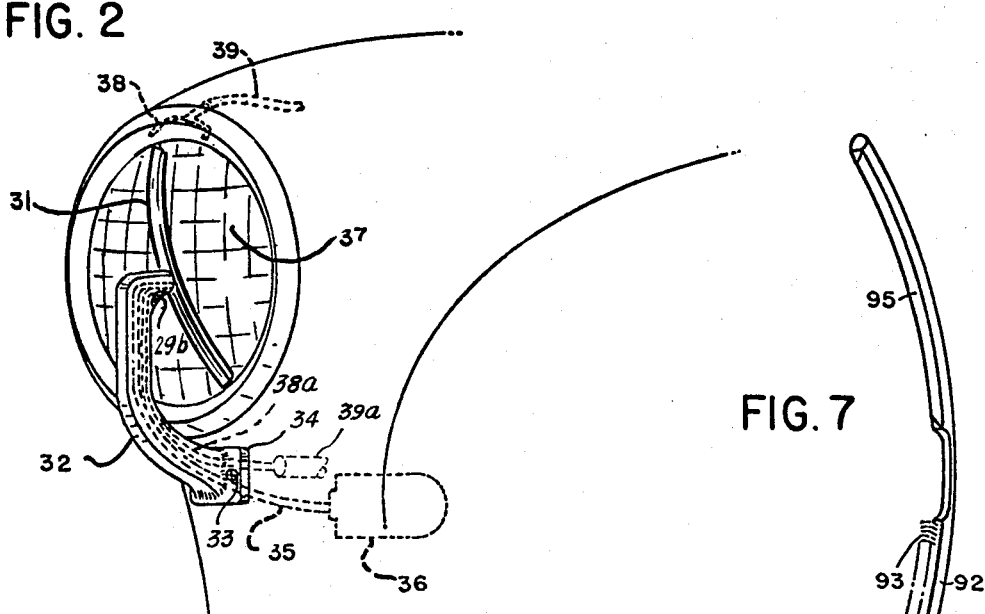
FIG. 2 is an isometric view of another arrangement of my headlamp cleaner, similar to that shown in FIG. 1 but with the driving means therefor remotely located.

FIG. 2 shows an alternative embodiment as applied to a conventional headlamp in which the motor 34 is spaced from the support and drives blade 29 by means of cable 33. Water is introduced through openings 38 in fluid flow connection with a conventional window washing reservoir through tube 39, or alternatively and preferably through passage 38a and tube 39a.

With reference now to FIGS. 3 and 4 of the drawings, another arrangement for concealing the driving mechanism for a rotary-mounted wiper blade 40 is illustrated such that, generally speaking, only the wiper blade 40 of the mechanism is readily apparent to an observer. In the arrangement of FIGS. 3 and 4, however, a conventional headlamp 42, mounted in the conventional manner, as by circular bracket 44, can be utilized. The circular bracket 44, however, is concealed, as better shown in FIG. 4, behind a normally appearing headlamp rim 46 having rolled portion 48 extending about its inner periphery.

Another circular bracket 50, to which the wiper 40 is supportingly secured, is formed with a cooperating rolled portion 52 at its outer periphery for complementary insertion into the rolled portion 48 of the headlamp rim 46 where it is thus rotationally mounted. When assembling the circular wiper bracket 50 and the headlamp rim 46, the circular bracket 50 is first provided with its rolled portion 52 and aligned as illustrated in FIG. 4 with the headlamp rim or bezel 46. The headlamp rim is then rolled at 48 to rotatably retain the circular bracket 50 therein, in this example. When the headlamp rim 46 is mounted by suitable bracket (not shown) with reference to the headlamp 42, a wiper blade 54 of the wiper 40 is provided with such width as to bear upon the outer surfaces of headlamp lens 56. As better shown in FIG. 4 both the wiper and the wiper blade 54 are provided, in this example, with an arcuate configuration so as to follow complementarily the contour of the lens 56. It is contemplated that a stationary light-transmitting lens cover (not shown), otherwise similar to the lens cover or shield 76 described below with reference to FIGS. 5 and 6, can be interposed between the blade 54 and the lamp 42 for protection of the latter so that the shield is cleaned instead by the blade 54. Such shield 76 and the headlamp lens 56 (and their equivalents) are sometimes hereinafter referred to collectively or generically as "headlamp means."

Rotation of the wiper bracket 50 is effected by means of a circular gear or rack 58 secured to the outer periphery of the wiper bracket 50 but concealed behind the headlamp rim 46. The circular rack 58 is thus disposed for engagement by pinion 60 mounted upon shaft 62 of a suitable driving means such as an electric motor 64 mounted within the fender structure 66. It will be appreciated that the angularity of the circular rack 58 relative to the wiper bracket 50 can be changed, and with it the length of the motor shaft 62 in order to accommodate the driving means to any one of the many differing fender and headlamp rim configurations. The motor 64 can be supplied by means of leads 69 from the electrical system of the automobile. Operation of the cleaning mechanism can be controlled, by a suitable switch (not shown) coupled in the supply circuit for the motor 64 and located on the dash of the automobile.

It will be understood that the rim or bezel 46 can be rotatably mounted on the fender 66 by similar interfitting rolled portions (not shown) or by other suitable rotational and bearing means. In the latter arrangement, the rim 46 can be provided with the circular rack 58 or equivalent. The wiper 40 then can be mounted directly upon the rotatable rim 46, in this example, for rotation therewith, and the circular bracket 50 eliminated.

If desired, water or a water and detergent solution can be applied to the headlamp lens 56 during the cleaning operation through openings 38' in fluid flow connection with a conventional window washing reservoir through tube 39'.

Referring now to FIGS. 5 and 6 of the drawings, another modification of my headlamp cleaning mechanism is illustrated where similar reference characters with primed accents refer to similar components of FIGS. 3 and 4. In the latter exemplification of the invention, a stationarily mounted wiper 70 is employed in order to render the cleaning mechanism even less obvious to the observer. In this form of the invention, the wiper 70 is secured at its ends to a stationary headlamp rim 72 which is mounted upon the fender 66' in the usual manner. The headlamp 42' and circular mounting bracket 44' are mounted immediately behind the headlamp rim in alignment therewith, as set forth above with reference to FIGS. 3 and 4. Between the stationary wiper 70 and the headlamp lens 56' a headlamp cover or shield 76 is rotatably mounted. At least the major proportion of the cover 76, i.e., that portion coextensive with the lens 56', is fabricated from a good, light-transmitting material such as glass or suitable plastic such as lucite. The cover 76, of course, need not be provided with a lens system, and therefore, can be rotated without changing the light pattern of the headlamp 42'.

At its periphery the lens cover 76 is joined to circular bracket 78 of similar configuration and function as the circular bracket 50 of FIGS. 3 and 4. Thus, the bracket 78 is rotatably mounted within the headlamp rim 72 by means of their respective interfitting rolled-over portions 80 and 82.

With this arrangement, of course, highway dirt and other soil accumulation occurs on the outer surface of the headlamp shield or cover 76, leaving the surface of the headlamp lens 56' free from dirt. Such soil is removed from the headlamp shield 76 by rotating it relative to stationary blade 84 of the wiper 70, which blade is of sufficient width to bridge the gap between the shield 76 and the wiper 70. For purposes of appearance the headlamp shield 76 can be provided with an arcuate configuration, as better shown in FIG. 6, in which case the wiper 70 and its blade 84 are complementarily shaped.

Rotation of the shield 76 passed the stationary wiper 70 is effected by rotating its bracket 78 in a manner similar to that employed for rotating the circular wiper bracket 50 of FIGS. 3 and 4. Thus, the bracket 78 is provided with a circular rack 86 which is driven by pinion 88 mounted on the driving shaft 90 of a suitable driving means (not shown). With the arrangement as shown in FIGS. 5 and 6 the operation of the headlamp cleaner is not apparent to the casual observer.

If desired, gap 89 between the headlamp lens 56' and the rotatable cover 76 can be more positively screened or sealed against entry of foreign matter by the installation of a wiping type circular sealing flange 91 on the rear surface of either the cover bracket 78 or the circular rack 86 for lightly wiping engagement with the forward surface of the headlamp bracket 44' or the outer periphery of the headlamp lens 56', as better shown in FIG. 6.

FIGS. 5 and 6 also illustrate an exemplary arrangement for actuating the cleaning mechanism 76 and 76' associated with an adjacent pair of headlamps in a dual headlamp system. In this arrangement rotary motion imparted to the rotating lens shield 76 is transferred to the adjacent lens shield 76', through its circular bracket 78' and rack 86', by means of an intermediately positioned idler gear 85. The gear 85 is rotatably mounted on shaft 87 for enmeshment with circular racks 86 and 86', and thus, the gearing train 86–85–86' is rotated by motor pinion 88. If desired, the drive motor therefor (which can be similar to the motor 64, FIG. 3) can be coupled to the pinion shaft 90 through a suitable gear ratio unit (not shown). Of course, the circular bracket 78' can be coupled to bracket 78 for rotation therewith by other suitable means such as a belt and pulley, etc.

It is to be understood also that the aforementioned electric motor or other suitable driving means can be coupled directly to the idler shaft 87 for direct rotation of the gear 85, in which case the pinion 88 and shaft 90 will be eliminated. Also contemplated is the fact that the blades 70, 70' can be mounted on rotatably mounted rims (not shown) in place of the stationary rims or bezels 72, 72' as noted above following the description of FIGS. 3 and 4 with reference to the rim 46. In the case where the rims 72, 72' are so replaced, the shields 76, 76' will be stationarily mounted as by securance to the stationary headlamp supports 44', or shields 76, 76' can be eliminated altogether and the blades of the wipers 70, 70' can bear directly upon the lenses of the headlamp 42'. Although a dual headlamp system is shown in FIGS. 5 and 6 it will be understood that appropriate features of the invention apply with equal force to a single headlamp system, as shown in FIGS. 5 and 6. By the same token the features of the invention as depicted in FIGS. 1–4 described above and in FIGS. 7 and 8 presently to be described can be employed in dual headlamp systems following the teachings of FIGS. 5 and 6.

A pair of the circular brackets 50, such as shown in FIGS. 3 and 4, likewise can be coupled in a dual headlamp system (not shown) for simultaneous rotation of a pair of the wipers 40. In the latter arrangement it is contemplated that the circular brackets and the cooperating rolled portions 48, 52 will be more deeply recessed into the associated headlamp rims, such as rim 46 to provide the necessary clearance. It is also considered that, where spacing of an adjacent pair of headlamps permit, the circular racks, such as 86 and 86' of FIG. 6, can be enmeshed directly (not shown) for contrarotation.

It will also be apparent that a single radius or half-blade can be substituted for any of the diametric or double wiper arrangements shown in the drawings. Such substitution is depicted exemplarily by one of the half-blades 98 or 100 in FIG. 8 of the drawings.

Figure 7:
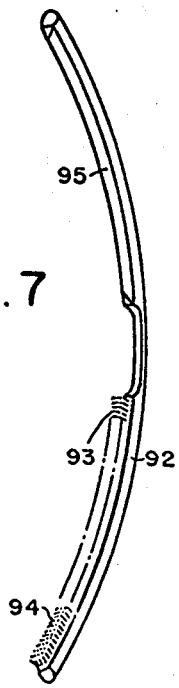
FIG. 7 is an enlarged, isometric view of a modified wiper blade arrangement suitable for use with the wiper blade mechanism.

In FIG. 7 of the drawings, a modified form of a wiper assembly 92 is illustrated which can be utilized with the cleaning mechanism of the invention. In the example, the wiper assembly includes a two-part cleaner 93, one half of which is an elongated relatively thin brush 94 while the other half of the cleaner 93 is a squeegee type blade 95, similar to that shown in the preceding figures. This arrangement is particularly useful for removing heavy soil which is preliminarily loosened by the brush portion 94 of the cleaner 93 and then wiped clean from the lens or lens cover as the case may be, by the squeegee blade 95.

Figure 8:
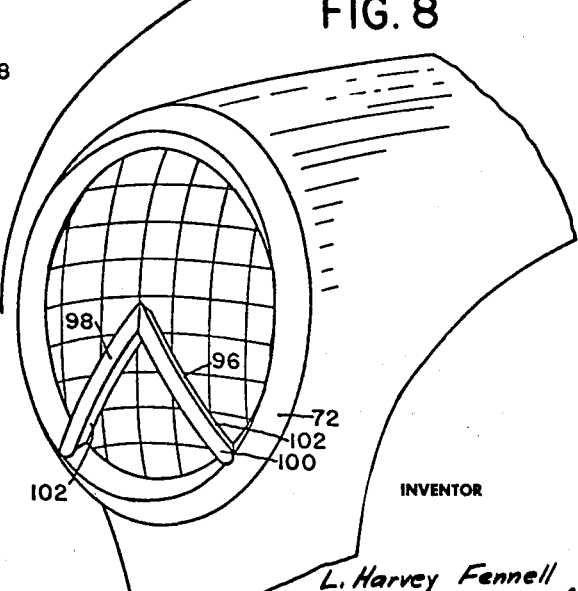
FIG. 8 is an isometric view of my headlamp cleaner mechanism and illustrating still another modification of the wiper blade structure.

In FIG. 8 a radial configuration of wiper arrangement is illustrated. In the latter form of the invention, a wiper 96 is provided in the form of a pair of radial arms 98 and 100, the outer ends of which are secured to the headlamp rim 72' while the inner ends are secured together for strengthening purposes. A suitable blade or cleaner structure 102 is secured to each of the arms 98, 100. The cleaner 102 can be formed as shown in FIG. 7 or as in any of the preceding figures, or alternatively one of the cleaners 102 can be of brush configuration while the other can be of a squeegee type. It is also contemplated that a single radial arm (not shown) supported in cantilevered fashion from the headlamp rim can be utilized.

In FIG. 9 of the drawings, a further modification of of my invention is shown, which is similar to that of FIG. 4 and related figures. In FIG. 9 the headlamp assembly 104 includes a mounting bracket or "bucket" 106 to which a headlamp 108 is secured by means of clamp ring 110 having a number of lugs 112 for this purpose. A base ring 114 made from a suitable structural plastic or other suitable structural material is slipped over the clamp ring 110 and, in this example, is retained thereon by frictional engagement. A ring gear or annular rack 116 is rotatably mounted on the base ring 114 and suitable clearances are provided to permit facile rotation of the gear 116. The gear ring 116 is restrained laterally by a relatively low, integral flange 118 formed on the base ring 114 and by snap ring 120. The snap ring 120 can be retained in a shallow recess 122 extending circumferentially of the base ring 114 and disposed laterally adjacent the gear ring 116.

Wiper means are mounted on the gear ring 116 for cleaning the headlamp lens 124, and in this example the wiper means engages the lens 124 directly. One form of such wiper means include wiper blade 126 extended substantially diagonally across the face of the lens 124 and provided with a suitable arcuate countour to follow, in longitudinal contact, the lens configuration as the blade 126 is revolved. Such revolution is accomplished by securing the ends of the blade 126 to a pair of brackets 128, 130, which are secured to the ring gear 116. In this example the brackets 128, 130 extend from lateral surfaces of the ring gear 116, which in this example are diagonally opposite.

Rotation of the ring gear 116 and the wiper means 126 are effected by pinion 132 enmeshed with the gear 116 and driven in this example by an electric motor 134 or other suitable motive means. The motor 134 can be mounted on the headlamp bucket 106 with bracket 136 so that the entire headlamp and cleaner system can be mounted and removed from vehicle 138 as a unit if desired. The motor 134 is provided with electric leads 140 for connecting the motor 134 to the vehicle electric system or other suitable source of potential and to suitable control switch means (not shown) which can be located on the dash board of the vehicle.

A similar headlamp cleaning system is shown in FIG. 10 of the drawings. In the latter arrangement, the clamp ring 110 and the base ring 114 are provided as a dual-functional band 142. The band 142 has a number of mounting lugs 144 whereby the band 142 can be secured to lugs 146 of the headlamp bucket 106'. The band 142 thus secures the headlamp 108' to the bucket 106' and provides a rotatable mounting for the gear ring 116'.

Another modification of the rotatably mounting and aligning means is shown in FIG. 11 for gear ring 116" which is provided with a circumferentially extending groove 148 on its inner periphery. Base ring 142' is provided with at least three apertures 150 conforming to a similarly disposed circumferential array about the ring 142' and alignable with the ring gear groove 148 when the ring gear 114" is mounted on the base ring 142'.

A guide pin or button 152 is inserted through each of the apertures 150 and projects into the ring gear groove 148. The guide pins 152 can be inserted after the ring gear 116" is properly aligned on the base ring 142', after which the guide pins 152 can be permanently secured to the base ring 142' as by welding or gluing. The guide pins 152 can be rounded as shown to reduce friction. Three or more of the guide pins can be utilized depending on operating conditions and the relative stiffness of the ring gear 116". When the guide pins 152 of FIG. 11 are utilized, the snap ring 120', groove 122' and flange 118' of the base ring 142 (FIG. 10) can be omitted. It will be apparent that the base ring 114 of FIG. 9 can be similarly furnished with guide pins, after the manner of FIG. 11.

Another form of tracking means of rotatably mounting and aligning means for the gear ring 116" is illustrated in FIG. 12 of the drawings. In this arrangement the base ring 42' is provided with a circumferential groove 154 which cooperates with snap-ring 156. The ends of the snap-ring 156 initially are provided with sufficient clearance 158 so that the ring 156 can be compressed for initial placement into the ring gear groove 148. The groove 148, however, is of sufficient depth so that the snap ring 156 can be expanded completely into the groove 148 to assure clearance when the ring gear 116", with the snap-ring 156 inserted in the groove 148, is slipped over the base ring 142'. When these components are properly aligned with the base ring 142', the snap-ring 156 snaps into the groove 154. The groove 154 is relatively shallow so that a sufficient proportion of the snap-ring 156 projects into the ring gear groove 148 to retain the ring gear 116" on the base ring 142'. It will be appreciated, of course, that the ring gear groove 148 and the snap ring 156 are suitably dimensioned so that the gear ring 116" rotates relatively freely over the snap ring 156.

Another modification of the tracking means for the gear ring 116" is shown in FIG. 13. In this arrangement the gear ring groove 148' can be made shallower and still accommodate the snap ring 156', which is enclosed as partly within base ring groove 154' and partly within gear ring groove 148', when the arrangement of FIG. 13 is fully assembled. A thinner gear ring 116" can be used accordingly. Means are provided, pursuant to this feature of my invention, for inserting a retaining member into the gear and base ring grooves, when the latter are aligned during partial assembly of the wiper mechanism.

When assembling the FIG. 13 arrangement, the gear ring 116" first is aligned generally with the base ring 142" such that the gear ring groove 148' substantially overlies the base ring groove 154'. The base ring further is provided with a slot 160 extending therethrough and opening into its groove 154'. The slot 160 is sufficiently elongated as shown so that the snap ring or similar retaining member 156' can be inserted through the slot at an angle so that it is guided into the enclosure formed by the gear ring groove 148' and the base ring groove 154'. This is accomplished by separating the ends 162, 164 and by guiding one of the ends, for example the end 162, through the slot 160 and into the aforementioned grooves. If desired, the other end 164 of the retaining member 156 can be provided with a wire or a thread 166 imbedded therein, which will protrude slightly through the slot 160 when the ring 156' is fully inserted. By grasping and pulling the thread or wire 166, the retaining member 156' can be withdrawn through the slot 160 in the event that disassembly of the headlamp cleaner arrangement becomes necessary. It will be understood, of course, that the slot 160 can be formed alternatively in the gear ring 116" for similar insertion of the retaining ring 156'. Although the retaining member 156' is illustrated as a split ring, an obvious substitute is a strip of plastic, such as nylon or the like, or other suitable elongated member.

Figure 14:
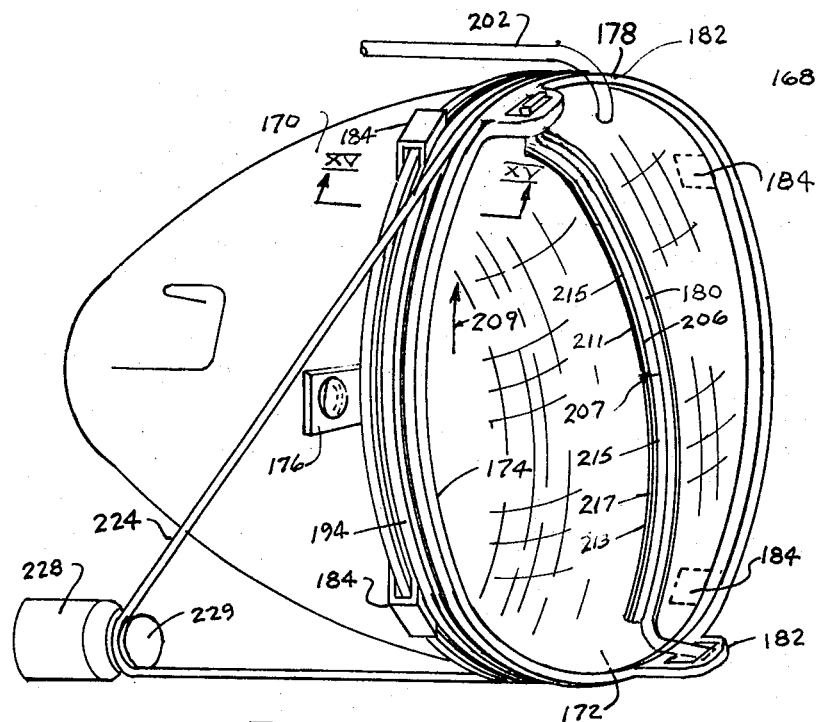
FIG. 14 is an isometric view of still another form of my novel automotive cleaning system.
Figure 15A:
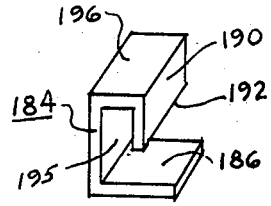
FIG. 15A is an enlarged isometric view of one of the clamping members illustrated in FIGS. 14 and 15.
Figure 15:
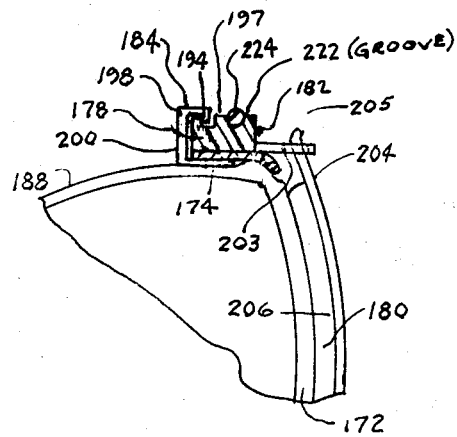
FIG. 15 is a partial cross-sectional view of the apparatus as shown in FIG. 14 and taken along reference line XV — XV thereof.
Figure 15B:
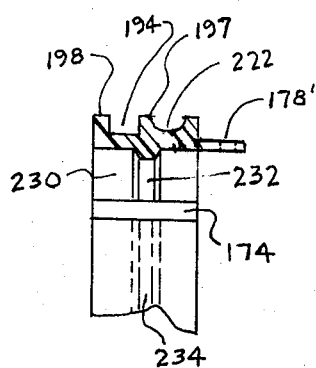
FIG. 15B is a partial cross-sectional view of a modified form of the wiper mounting ring, as arranged in accordance with the invention.

Another modification of my automotive cleaning system 168 is shown in FIGS. 14–15B of the drawings. The headlamp cleaning system 168 includes in this example a single or unitary headlamp 170 having lens 172 and a mounting ring 174 with mounting brackets 176 thereon. Mounted on the headlamp mounting ring 174 is an annular support or supporting ring 178 for headlamp wiper blade 180. As better shown in FIG. 15 the wiper mounting ring 178 can be rotatably mounted in an unexpected fashion on the outer surface of the headlamp mounting ring 174. The wiper blade 180 likewise is mounted on the wiper supporting ring 178 in a unique fashion, in further accordance with the invention. The ring 178 is provided in this example with a pair of diametrically opposed tabs 182 to which the ends of the wiper blade 180 are secured. The wiper blade 180, therefore, aids in positioning the wiper supporting ring 178 on the headlamp ring 174, when the wiper blade 180 is disposed flushly against the headlamp lens 172. Unexpected means are also provided for further positioning or tracking the wiper ring 178 with respect to the headlamp ring 174.

One arrangement of such means includes a number of substantially C-shaped brackets 184 as better shown in FIGS. 15 and 15A of the drawings. In this example four such brackets 184 are utilized, although obviously a different number can be employed. When properly installed the brackets 184 maintains or tracks the wiper support 178 at its proper rotative position on the headlamp ring 174 such that the annular wiper support maintains the wiper blade 180 against the lens 172.

In this arrangement each bracket 184 is provided with a base member 186 which is inserted between the headlamp ring 174 and the adjacent surfaces 188 of the headlamp, where the brackets 184 are frictionally and securely retained. Each bracket 184 further is provided with a depending section 190, as viewed in FIGS. 15, 15A of the drawings the lower end 192 of which rides in groove 194 of the wiper support ring 178. An upper section 196 of each bracket is sufficiently broad to clear the adjacent inward end wall 198 of the wiper ring 178 as better shown in FIG. 15. A rear bracket section 200 connects the bracket 184 with its elongated base member 186.

The base 186 of each C member 184 is frictionally maintained between the headlamp mounting ring 174 and the headlamp 170, where it is securely inserted, as described previously. The shaped brackets 184 desirably are fabricated from a fairly stiff but resilient plastic such that they can be maneuvered into their positions as shown in FIGS. 15, 15A, when the wiper blade and its annular support 178 are positioned on the headlamp as shown. Thus inserted, the brackets 184, by their engagement in the rear groove 194 of the wiper support ring 178, prevent forward axial movement of the wiper support. On the other hand, rearward movement thereof is prevented by longitudinal engagement of the wiper blade 180 with the headlamp lens 172. Accordingly, the wiper ring 178 is maintained or tracked against any axial movement of the wiper and its support ring 178 relative to the headlamp 170 by the sliding connection between the depending sections 190 of the several brackets 184 and the wall surfaces of the end wall 198 of the wiper ring 168.

However, in the absence of the wiper blade 180 either by accident or by intention removal, the wiper support ring 178 or annular support is tracked upon the headlamp means 170 solely by the depending sections 190 of the brackets 184. As mentioned previously the brackets 184 restrain the annular support 178 against forward movement relative to the headlamp 170. Substantial rearward movement of the wiper support 178 (in the absence of the wiper blade 180) is still prevented by engagement of the adjacent lateral surface of the wiper support 178 with vertical sections 195 of the brackets 184, or by sliding engagement of the central rib 197 of the wiper ring 178 with the depending section 190 of the brackets 184.

A sliding engagement also occurs between the underside of the wiper ring 178 and the outward side of the headlamp mounting ring 174. The wiper support ring thus is mounted for rotational movement about the headlamp mounting ring by means which will presently be described. The frictional retention of the brackets 184 is such that the wiper support ring 178 and wiper blade 180 are urged toward the rear of the headlamp such that the wiper blade 180 desirably is pressed against the surface of the lens 172. This applies the requisite cleaning action when the wiper blade 180 is rotated by rotation of its supporting ring 178, as presently described. Cleaning of the lens 172 during rotation of the wiper 180 can be facilitated by conducting an appropriate washing fluid to the surface of the headlamp lens 172 through conduit 202 (FIG. 14) coupled to a suitable pump and source of cleaning fluid (not shown).

The unique mounting and tracking arrangement of the wiper support 178 stems from the fact that the contact of the wiper blade 180 with the headlamp lens 172 prevents rearward displacement of the wiper ring 178, while the brackets 184, which are mounted as shown, prevent frontward displacement of the ring 178.

The wiper blade 180 can be fabricated with a metal or other relatively rigid backing strip 204 to which is secured or bonded a rubber or squeegee type blade 206. Bonding can be accomplished in a conventional manner or in accordance with FIG. 15C as described below. The ends of the backing strip can be hooked as shown, as denoted by reference numerals 205, for engagement with the wiper support tabs 182. The tabs 182 are each provided with an aperture 203 to receive the hooked ends 205. The backing strip is sufficiently resilient however to permit arching to insert its hooked ends 205 through the tab apertures 203. When thus inserted the hooked ends 205 are retained against the outward edges of the tab apertures, by the resilience of the wiper blade 206.

To facilitate the lens cleaning operation at the center of the lens 172, the squeegee blade 206 is slit preferably at its rotational center, as denoted by reference numeral 207 (FIG. 14). When rotated, for example in the direction of arrow 209, the slit 207 permits the two halves 211, 213, thus defined, of the blade 206 to separate. The upper blade half 211 (as viewed in FIG. 14) is flexed or inclined to the rear. This allows an effective squeegee type cleaning action along the entire length of the blade 206, which would be impossible without the central slit 207. The cleaning action of the blade 206 is enhanced by one or more longitudinal blade ridges 215 extending closely along the free edge 217 of the blade. It will be understood that the wiper construction described below or any of the foregoing wiper means can be similarly provided with a central slit such as the slit 207 and the longitudinal redges 215, and the appropriate ones of these can be mounted with mounting tabs and hooked ends.

Alternatively as shown in FIG. 15C a wiper blade 208 can be fabricated further in accordance with the invention. In this arrangement a flexible blade member 210 includes a squeegee section 212 having a tubular member or container 214 extending substantially along the entire length thereof. A slit or relatively flat passage 216 extends through the tubular member 214. Inserted through the passage 216 is a stiffening member 218, which can be fabricated from a suitable structural material such as half hard spring steel. The stiffener 218 terminates at each end in an integral tab connector 220, whereby the wiper assembly 208 can be mounted on a wiper support ring such as the annular support 178 of the preceding figures.

One arrangement for rotating the wiper support 178 and wiper 180 is illustrated in FIGS. 14 and 15 of the drawings. In furtherance of this purpose the wiper ring 178 is provided with a second groove 222 to receive a drive belt 224 which can be fabricated for an example after the manner of a relatively large O-ring. The drive belt 224 is driven to rotate the wiper ring 178 by looping the belt 224 around the wiper ring 178 at its groove 222 and around pulley 226, which can be driven by suitable drive means such as electric motor 228. The motor 228 can be suitably mounted on any portion of vehicular structure (not shown) adjacent the headlamp 170. Appropriate control means can be located on the dash of the vehicle for energizing the electric motor 228 and the pump (not shown) for the cleaning fluid system 202.

Referring now to FIG. 15B of the drawings a modified form of wiper support 178' is illustrated with means for reducing the sliding friction between the wiper support ring 178' and the headlamp mounting ring 174'. In this arrangement the inner surface 230 of the wiper ring 178' is provided with a runner 232 of relatively low profile with respect to the inner surface 230 of the wiper support. The runner can taper to a fairly narrow inwardly extending surface 234 if desired. Use of the runner 232 prevents large surface engagement between the rotatable wiper support ring 178' and the stationary headlamp mounting ring 174'. Instead the sliding or rubbing areas of these respective items are limited to the relatively small area of the inward side 234 of the runner 232. Accordingly, the sliding friction between the items 178', 174' is correspondingly reduced, and this to a very large extent.

Referring now to FIGS. 16, 17 of the drawings an analogous headlamp cleaning system 236 is presented by the invention as adapted for a dual automotive headlamp system 238, 240. In the latter arrangement of the invention similar reference characters with primed accents denote similar components. An annular wiper support 242 or 244 is provided for each of the headlamps 232, 248 and is rotatably thereon after the manner of the preceding Figures. In general the overall construction and configurations of the support rings 242, 244 are similar to the wiper support rings 178, 178' of the preceding figures. However, at least one of the wiper support rings 242, 244 is each provided with a third groove 246 as better shown in FIG. 17. The wiper rings 242, 244 are interconnected by means of drive belt 248 seated in the third groove 246 of the support ring 242 and in a groove 246a aligned therewith in the other wiper support 244, as shown in the figures. The drive belt 248 can be constructed after the manner described above for the drive belt 224. Rotation of the wiper support ring 244 is thus slaved to rotation of the other wiper support ring 242. The wiper blades 180' of the headlamps 238, 240 are thus rotated in the same direction and at the same speeds.

Relative to the slaved wiper ring 244 the intermediate groove corresponding to the groove 224' of the wiper ring 242 can be omitted. However, this groove, although not used, desirably is provided in the slaved wiper support 224 for interchangeability of parts and to minimize parts inventory. The pair of wiper rings 242, 244 are driven by transmission belt 224', pulley 226' and drive means 228' after the manner described in the preceding figures, with the exception that the transmission belt 224' is located in this example in the intermediate groove 224' of the adjacent wiper ring 242.

A dual headlamp cleaning system of FIGS. 16 and 17 is particularly adaptable for dual headlamps, such as the headlamps 238, 240, which are mounted in the same or substantially the same transverse plane relative to the long axis of the vehicle (not shown). Where, however, one of the headlamps, such as the dual headlamp system 250–252 of FIG. 18, lags or leads the other a differing arrangement of common drive means, such as electric motor 254, desirably is employed in the cleaning system 249. It will be assumed that headlamp 252, which may be the outboard lamp of a dual headlamp system, is displaced to the rear of the inboard lamp 250. Each of the headlamps 250, 252 is provided with a wiper support ring 178a which can be constructed similarly to the wiper support 178 of FIGS. 14 and 15 or the wiper support 178' of FIG. 15B. The power shaft 256 of the motor 254 is protruded from each end thereof for connection to a drive pulley 258 or 260. The rear pulley 260 is coupled to the wiper ring 178a of the headlamp 252 after the manner of FIG. 14, while the front pulley 258 is coupled to the wiper ring 178 of the other headlamp 250 in a similar manner, using a pair of drive belts 224" similar to the belt 224 or 224' of the preceding figures.

Where the headlamps 252, 250 are displaced at a distance less than the length of the motor 254, the pulleys 258, 260 can be connected to a power shaft further extended from one side of the motor 254 with the pulleys being suitably spaced therealong (not shown). The dual headlamps cleaning systems 236 or 249 of FIGS. 16–18 can be provided with cleaning fluid conduits such as the conduit 262, 264 of FIG. 16 to enhance the cleaning action of the blades 180'.

In any of the embodiments as shown in FIG. 9 a lens washing unit can be added, according to the teachings of FIGS. 1-3.

In other embodiments of my invention, the aforementioned motor means can be replaced by vacuum-operated motive means or by connection with any moving part of the car, or other suitable means.

From the foregoing, it will be apparent that novel and efficeint forms of headlamp cleaners and similar cleaning mechanisms have been disclosed herein. While I have illustrated and described certain preferred embodiments of my invention in the foregoing specification, it will be understood that this invention may be variously embodied within the spirit and scope thereof.

I claim:

1. A headlamp cleaning system comprising wiper means having flexible wiper edge means in contact with headlamp means, means for rotatably supporting one of said wiper means and said headlamp means, and means for driving that one of said wiper means and said headlamp means so supported such that said wiper means and said headlamp means are relatively rotated one against the other, said wiper means being elongated and supported at its ends by annular support means which are substantially aligned with said headlamp means, said support being mounted adjacent said headlamp means so that said wiper edge means are longitudinally engaged with said headlamp means during said relative rotation of said wiper means and said headlamp means.

2. The combination according to claim 1 wherein said support is a generally circular bracket mounted on a headlamp rim for said headlamp means and substantially aligned with the periphery of said headlamp means, and rotary mounting means are provided for rotatably mounting said bracket on said rim.

3. The combination according to claim 2 wherein said rotary mounting means include complementary rolled portions cooperatively formed on said bracket and on said rim respectively.

4. The combination according to claim 2 wherein said driving means are coupled to said wiper means, said driving means including a circular rack secured to the outer periphery of said bracket for cooperation with a pinion also forming part of said driving means, said pinion and said rack being concealed behind said rim.

5. The combination according to claim 1 wherein said annular support is a headlamp rim for said headlamp mounted generally in alignment with said headlamp means but spaced forwardly thereof, said headlamp means include a light-transmitting lens shield positioned generally between said wiper and headlamp lens, and means are provided for rotatably mounting one of said shield and said wiper means, said driving means being coupled to that one of said wiper means and said shield so mounted.

6. The combination according to claim 5 wherein said lens shield is rotatably mounted upon a circular bracket which in turn is rotatably mounted upon said rim, said driving means are coupled to said shield for rotation thereof, said wiper means being stationarily mounted with said rim.

7. The combination according to claim 6 wherein said driving means include an enmeshed substantially circular rack and pinion mounted on said bracket and coupled to said lens shield and said driving means respectively, said rack and pinion being concealed behind said rim.

8. The combination according to claim 1 wherein said headlamp is a dual headlamp system and said wiper means include a pair of wipers provided respectively for each pair of headlamps of said system, and means are provided for rotatably mounting one group of the group of said wipers and the group of said headlamp means, said driving means being coupled in driving relation to that one group so mounted.

9. The combination according to claim 8 wherein said driving means include substantially circular racks mounted respectively on the members of said one group and enmeshed through gearing means, said driving means being coupled to one of said racks.

10. The combination according to claim 9 wherein said one group is that of said headlamp means, said last-mentioned means includes light-transmitting shield members secured respectively to said racks for rotation thereby, and said wipers are stationarily mounted in contact respectively with said shield members.

11. The combination according to claim 1 wherein means are provided for depositing cleaning fluid upon the surface of said headlamp means engaged by said wiper means to facilitate cleaning thereby.

12. The combination according to claim 1 wherein said support is rotatably mounted on said headlamp means, and said driving means are coupled for rotating said support and said wiper means.

13. The combination according to claim 12 wherein said support and said driving means include an annular rack and pinion respectively, and said wiper means are supported at end thereof to brackets secured respectively to diametrically opposed surfaces of said rack.

14. The combination according to claim 12 wherein said annular support is rotatably mounted on a base ring therefor which is secured to said headlamp means, and means are provided for rotatably mounting and aligning said annular support relative to said base ring.

15. The combination according to claim 14 wherein said rotatably mounting and aligning means include a circumferential groove formed on a periphery of said annular support and a similarly disposed array of guiding projections extending from said base ring into said grooves.

16. The combination according to claim 14 wherein said rotatably mounting and aligning means include a pair of alignable circumferential grooves formed on the inner periphery of said support and on said base ring respectively, and a retaining member shaped for insertion into said grooves.

17. The combination according to claim 16 wherein a through slot is formed in one of said support and of said base ring in communication with the associated one of said grooves for insertion of said retaining member after assembly of said support and base ring.

18. The combination according to claim 17 wherein said member is provided with a wire or thread imbedded in one end thereof and juxtaposed to said slot when said retaining member is fully inserted for subsequent removal of said retaining member through said slot.

19. The combination according to claim 1 wherein said annular support is rotatably engaged with said headlamp means, and means are provided for tracking said annular support relative to said headlamp means.

20. The combination according to claim 19 wherein said tracking means include means engaging said annular support for restraining said support against forward motion thereof relative to said headlamp means, said support being restrained against rearward motion thereof by engagement of said wiper means with said headlamp means.

21. The combination according to claim 1 wherein said wiper means are coupled to said driving means, said driving means including a drive belt mounted in a circumferential groove on said annular support for rotating said annular support and wiper means relative to said headlamp means.

22. The combination according to claim 19 wherein said tracking means include guide means secured to said headlamp means and extending into a circumferential groove formed in said annular support.

23. The combination according to claim 22 wherein said driving means include a transmission belt, and said annular support is provided with a second groove generally parallel to the first-mentioned groove for receiving said transmission belt.

24. The combination according to claim 22 wherein said guide means include leg means inserted between a mounting ring for said headlamp and said headlamp means, said annular support being rotatably mounted upon said headlamp ring.

25. The combination according to claim 24 wherein said guide means include a plurality of bracket members, each of said bracket members having a leg portion so inserted between said headlamp ring and said headlamp means and having a depending portion engaged in said annular support groove to track said annular support on said headlamp ring.

26. The combination according to claim 1 wherein said annular support is mounted on said headlamp means for relative rotation, said annular support is provided with a relatively low profile runner extending circumferentially of its inner surface, said runner having a small surface area engaging said headlamp means for reduction in frictional losses.

27. The combination according to claim 1 wherein said wiper means include a blade structure fabricated from a resilient material, a container section coextending therewith and formed integrally therewith, said container section having a relatively flat passage, and a stiffening member closely fitting and extending through said passage.

28. The combination according to claim 1 wherein, said wiper means are coupled to said driving means, said headlamp means include a pair of dual headlamps, said annular support means including a wiper support ring rotatably mounted on each of said headlamps, tracking means for each of said wiper rings mounted on said headlamps, said wiper means including a wiper mounted on each of said rings for rotation therewith, and at least one circumferential groove on each of said wiper rings, said drive means including belt means seated in said grooves for rotating said wiper rings.

29. The combination according to claim 28 wherein said belt means include a first belt wrapped about said wiper support rings to slave movement of one of said wiper support rings to that of the other, and a second belt wrapped about said other wiper support ring and connected to motor means forming part of said driving means for rotating both of said wiper support rings.

30. The combination according to claim 1 wherein said wiper edge means is provided with a transverse slit adjacent the rotational axis thereof to facilitate cleaning of the adjacent area of said headlamp means.

31. The combination according to claim 1 wherein said annular support means include a pair of substantially diametrically opposed apertured tabs, said wiper means including a resilient and structural backing member extending along the length of said wiper edge means and protruding beyond the ends thereof, the protruding end portions of said backing member being hooked for retention in said apertured tabs.

32. The combination according to claim 30 wherein said wiper edge means in addition are provided with longitudinal ridges adjacent a free edge thereof to facilitate cleaning of said headlamp means.

33. The combination according to claim 1 wherein said wiper means are elongated so as to extend substantially across a lens of said headlamp means, said wiper edge means including a brush portion and a resilient or flexible blade portion.

* * * * *